INVENTORS
IRVING R. TAYLOR
and ARTHUR L. WILLIAMS
BY
ATTORNEYS

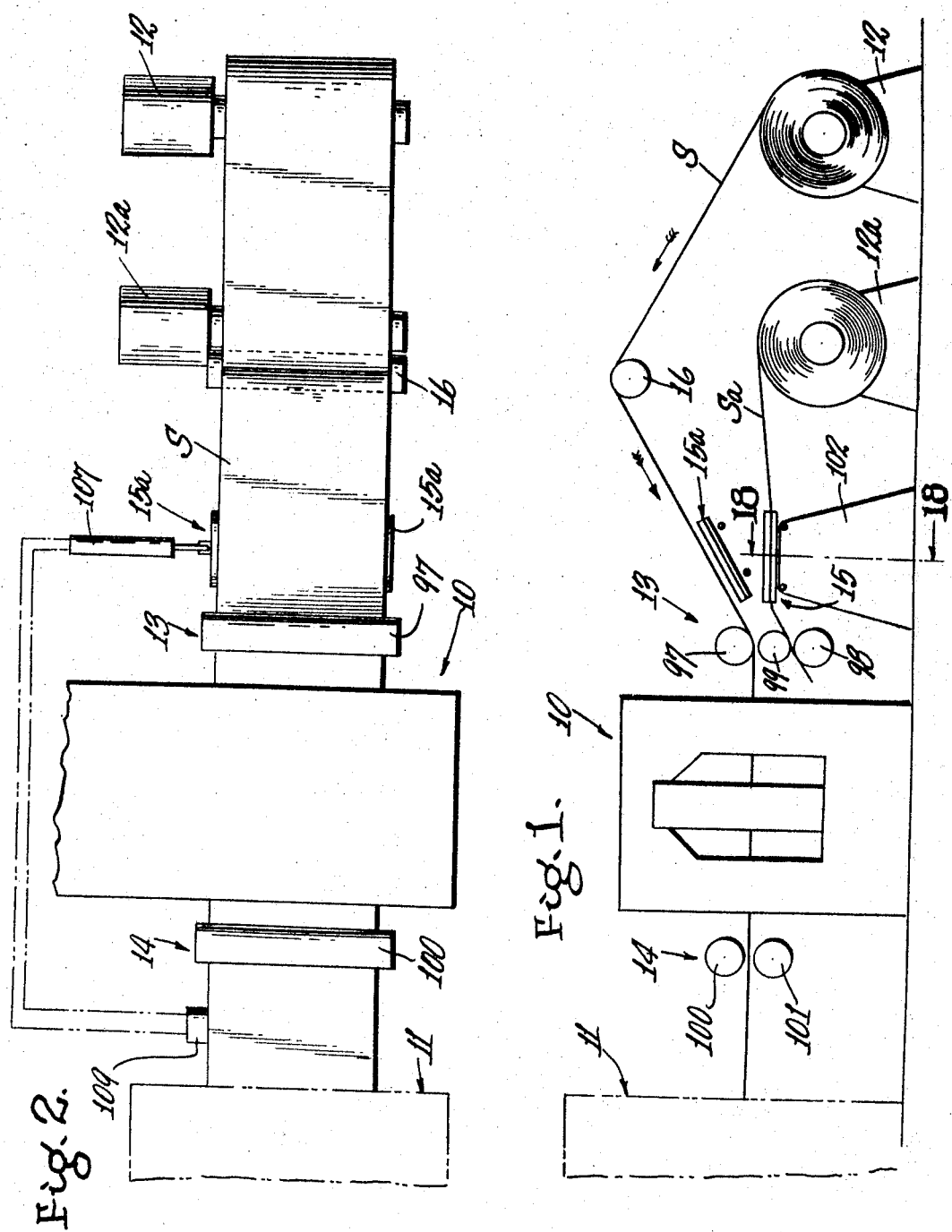

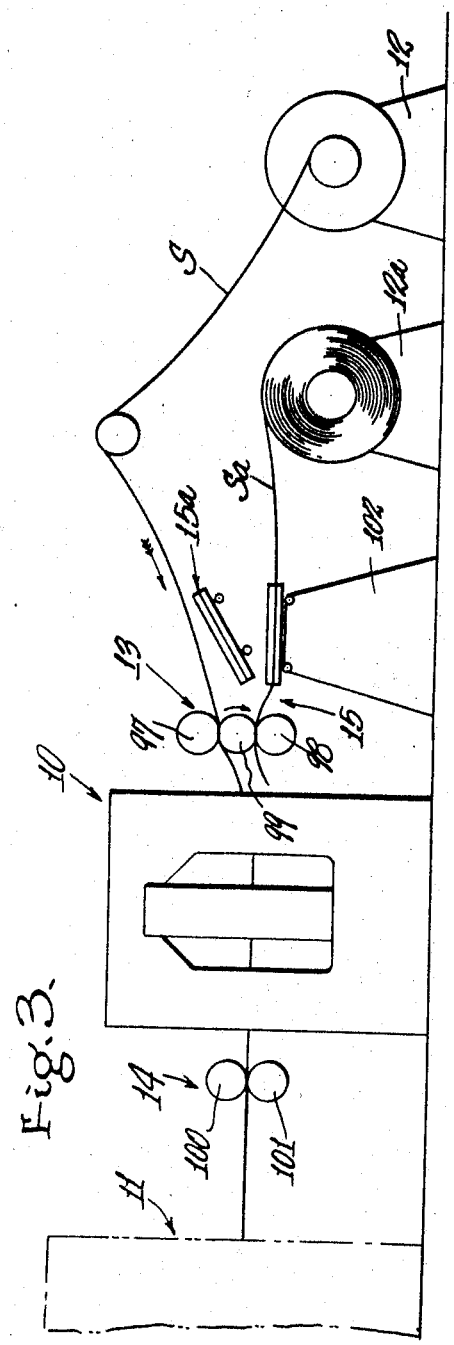
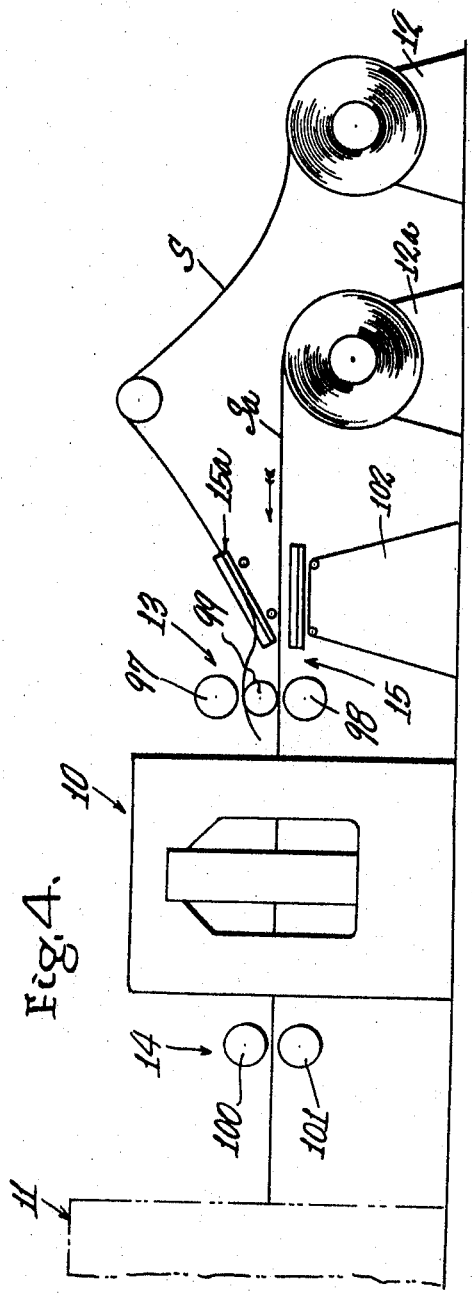

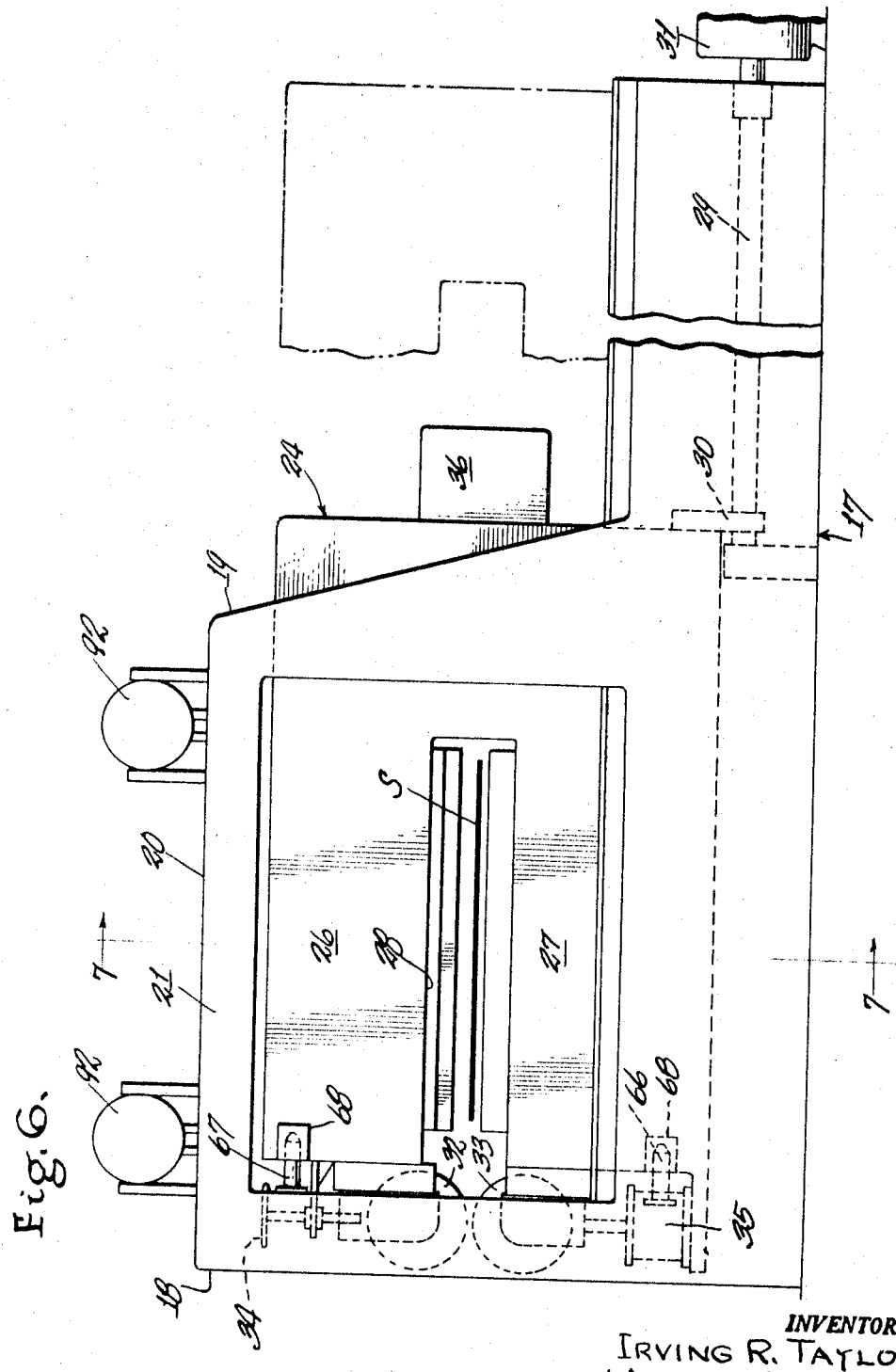

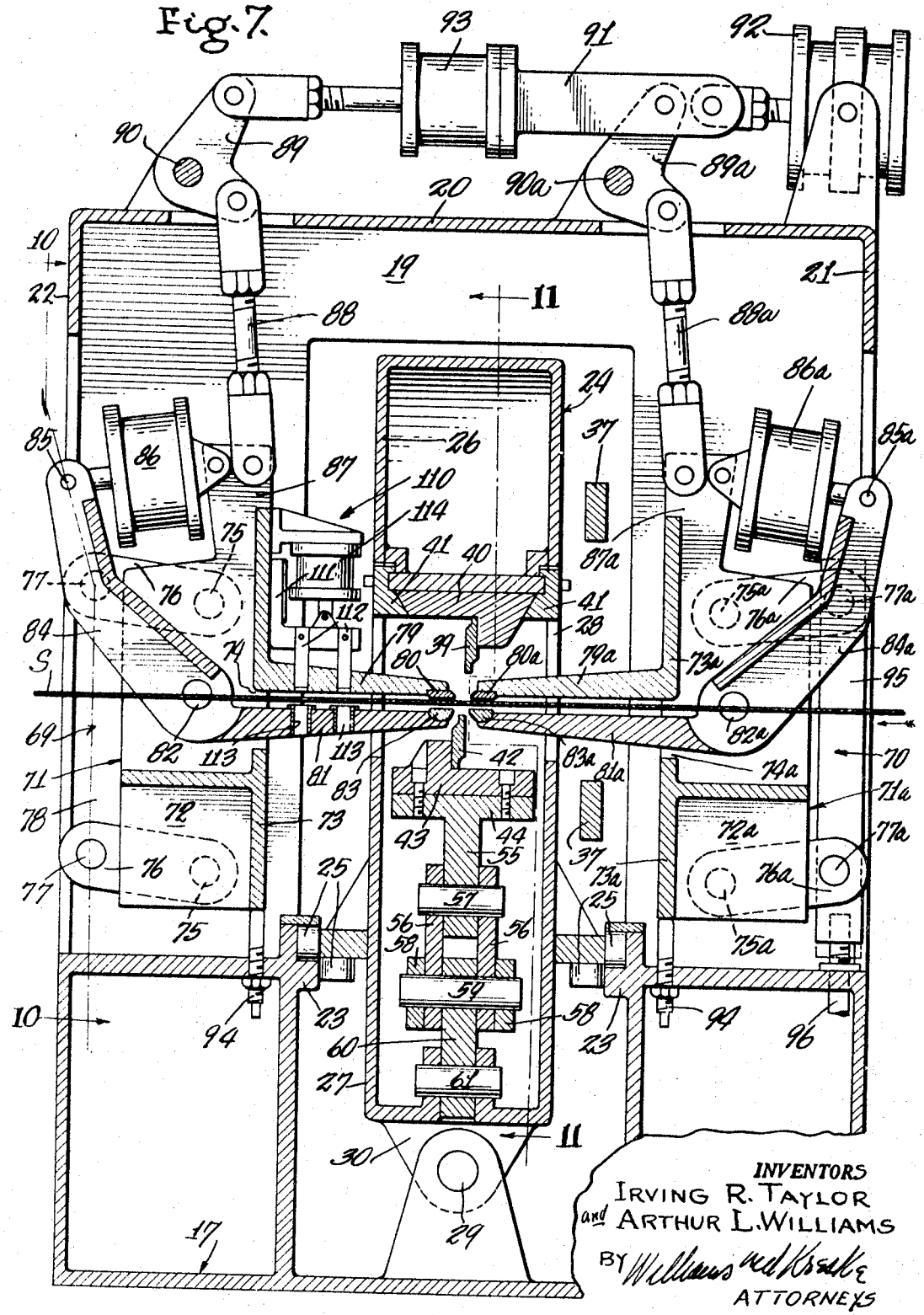

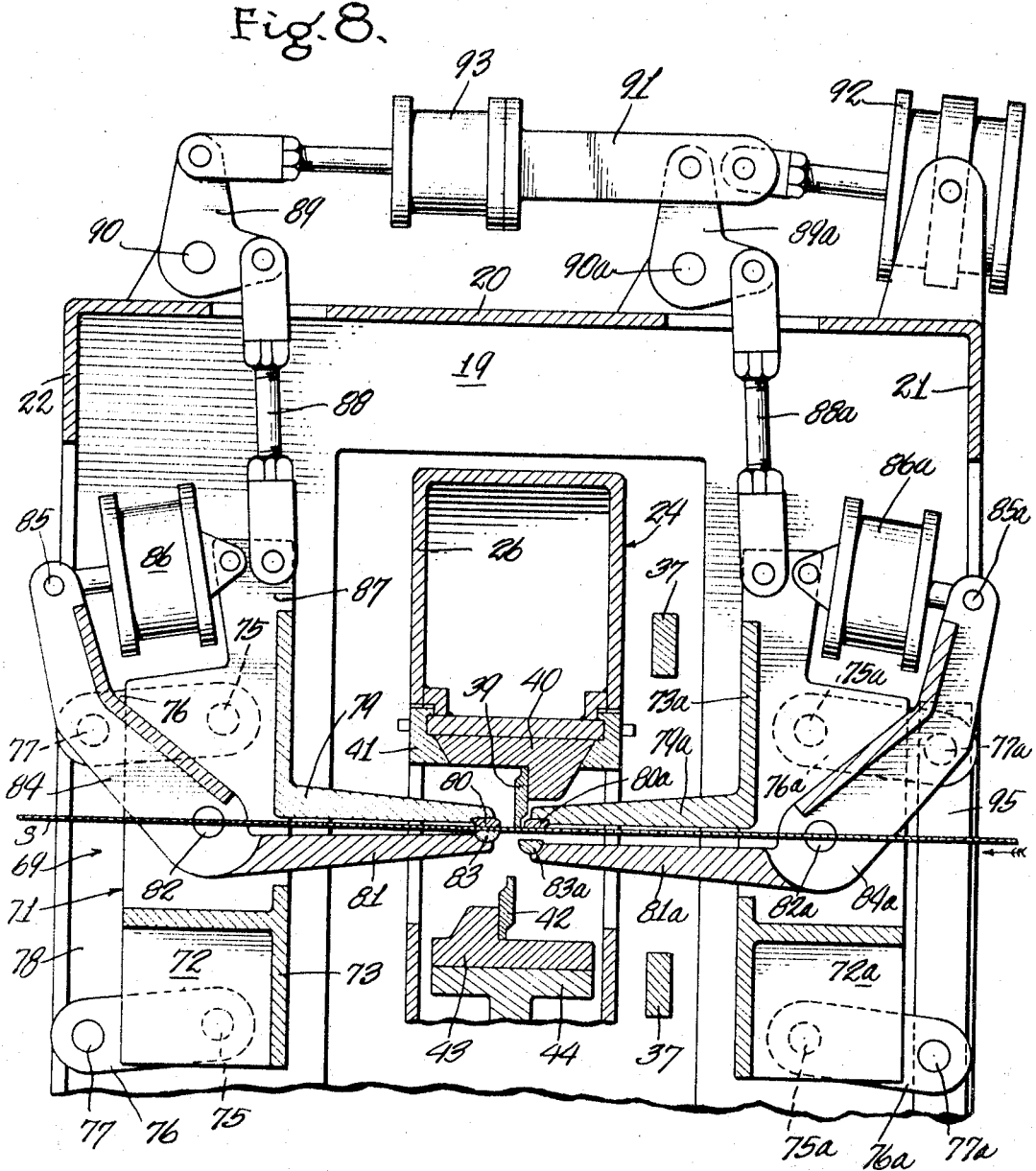

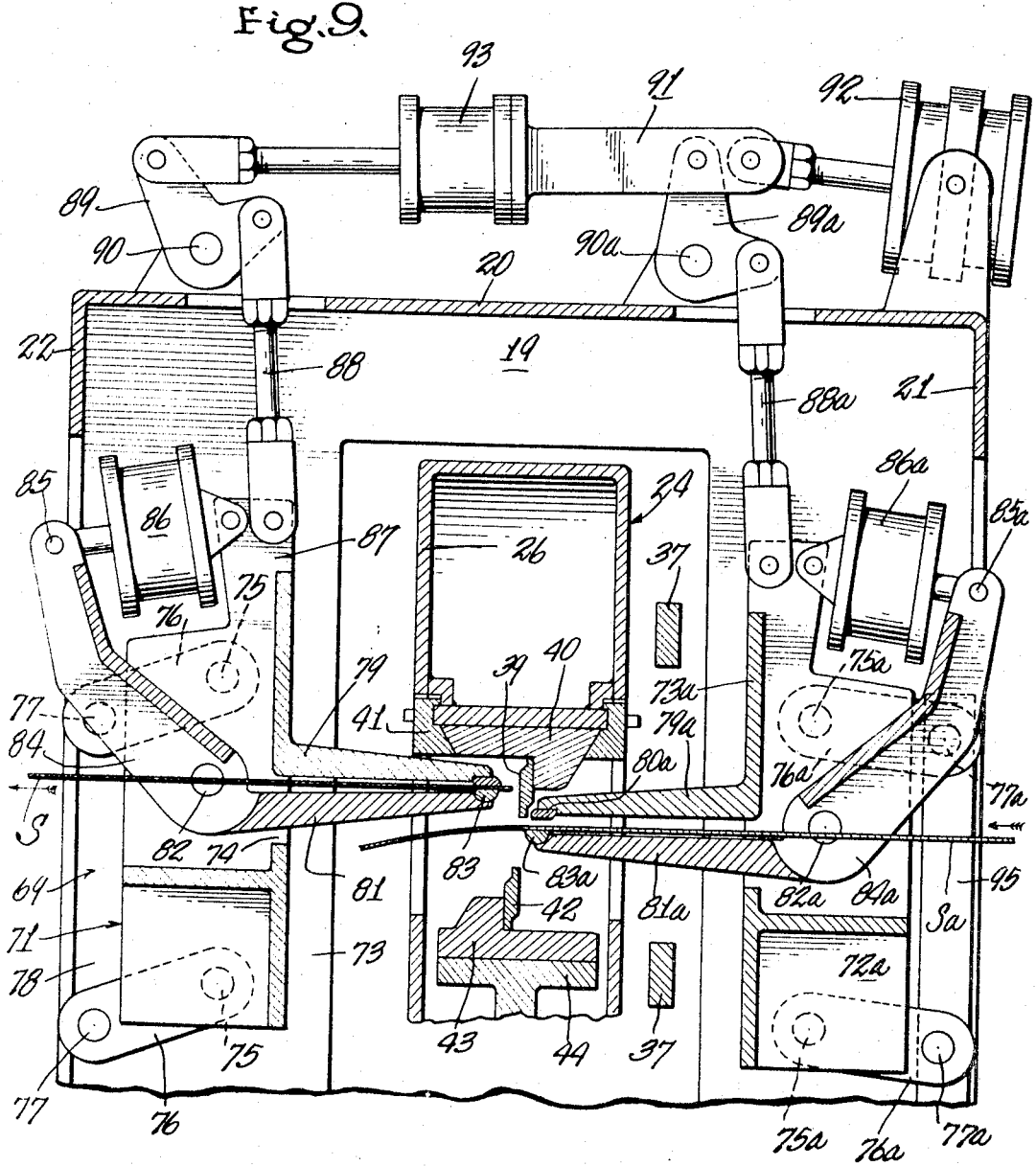

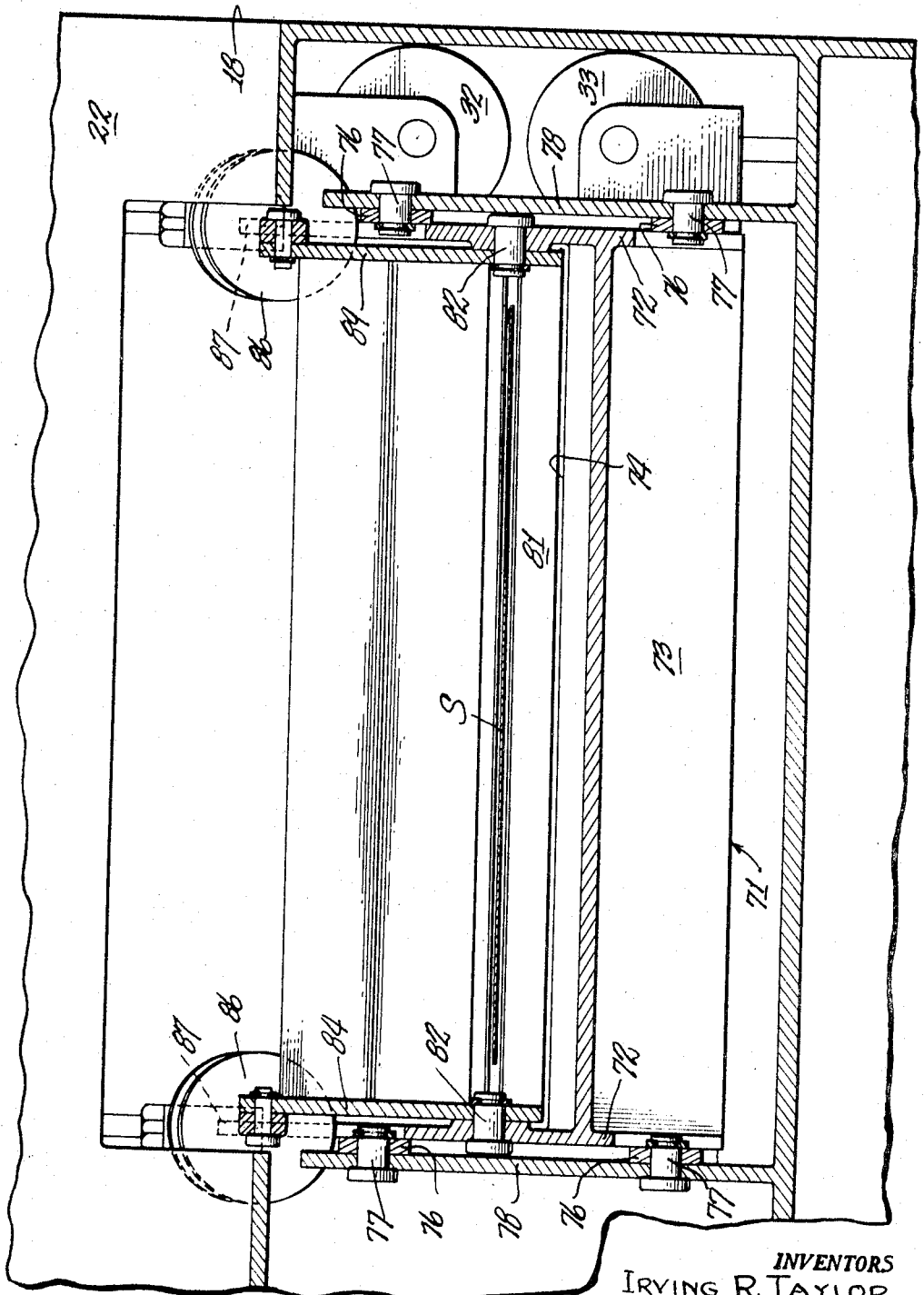

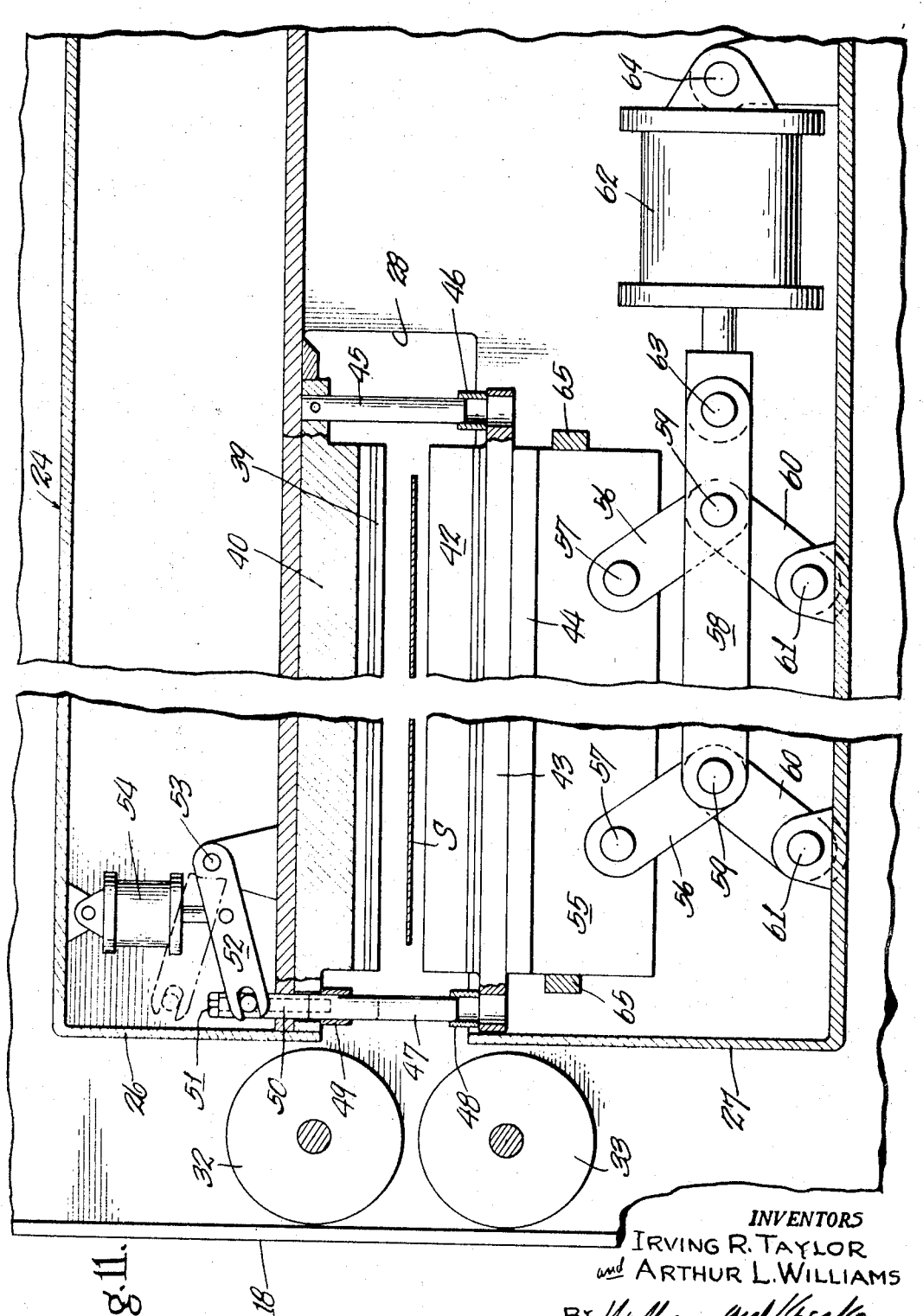

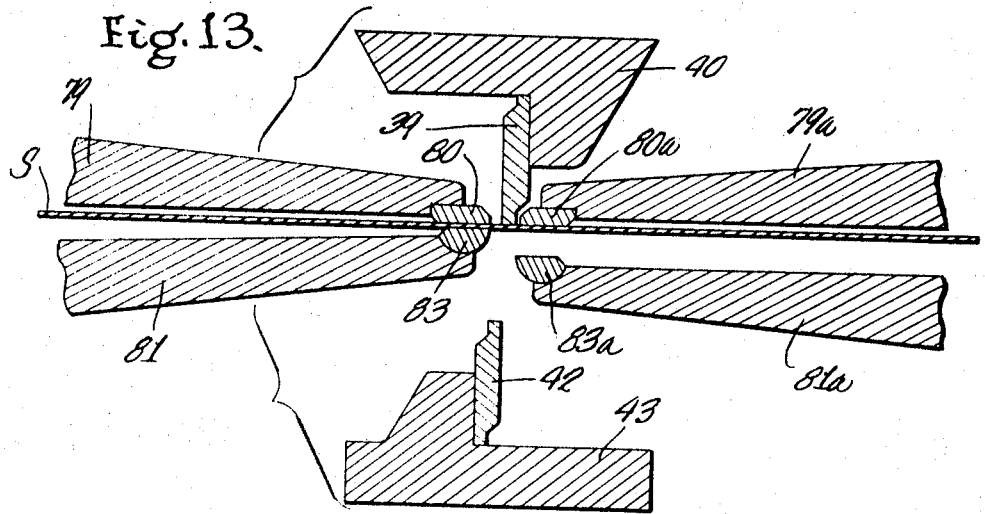
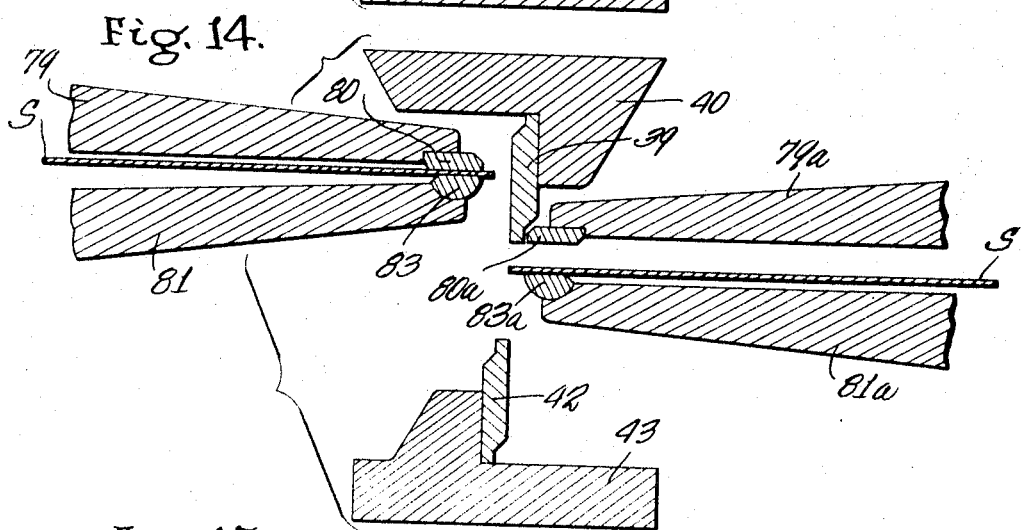
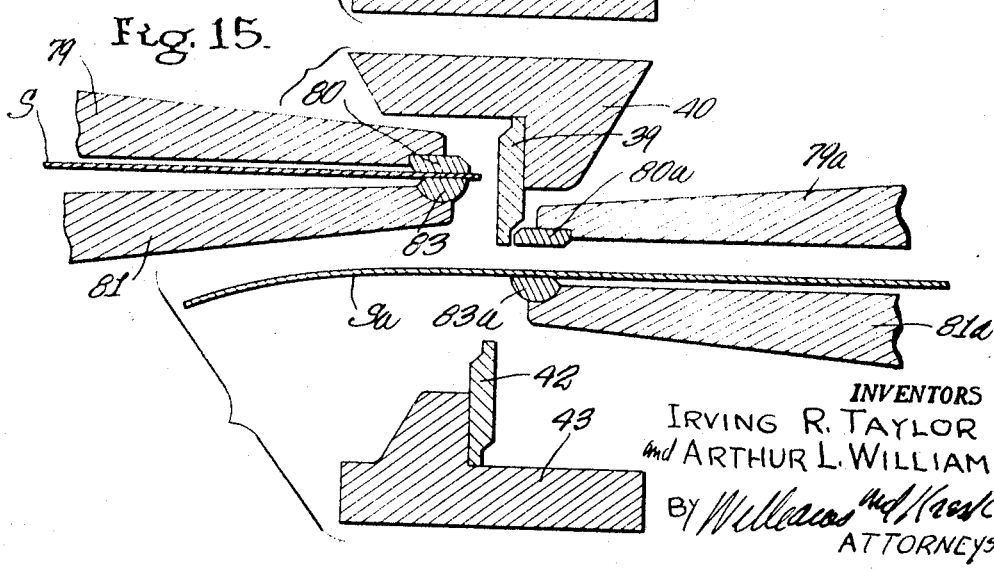

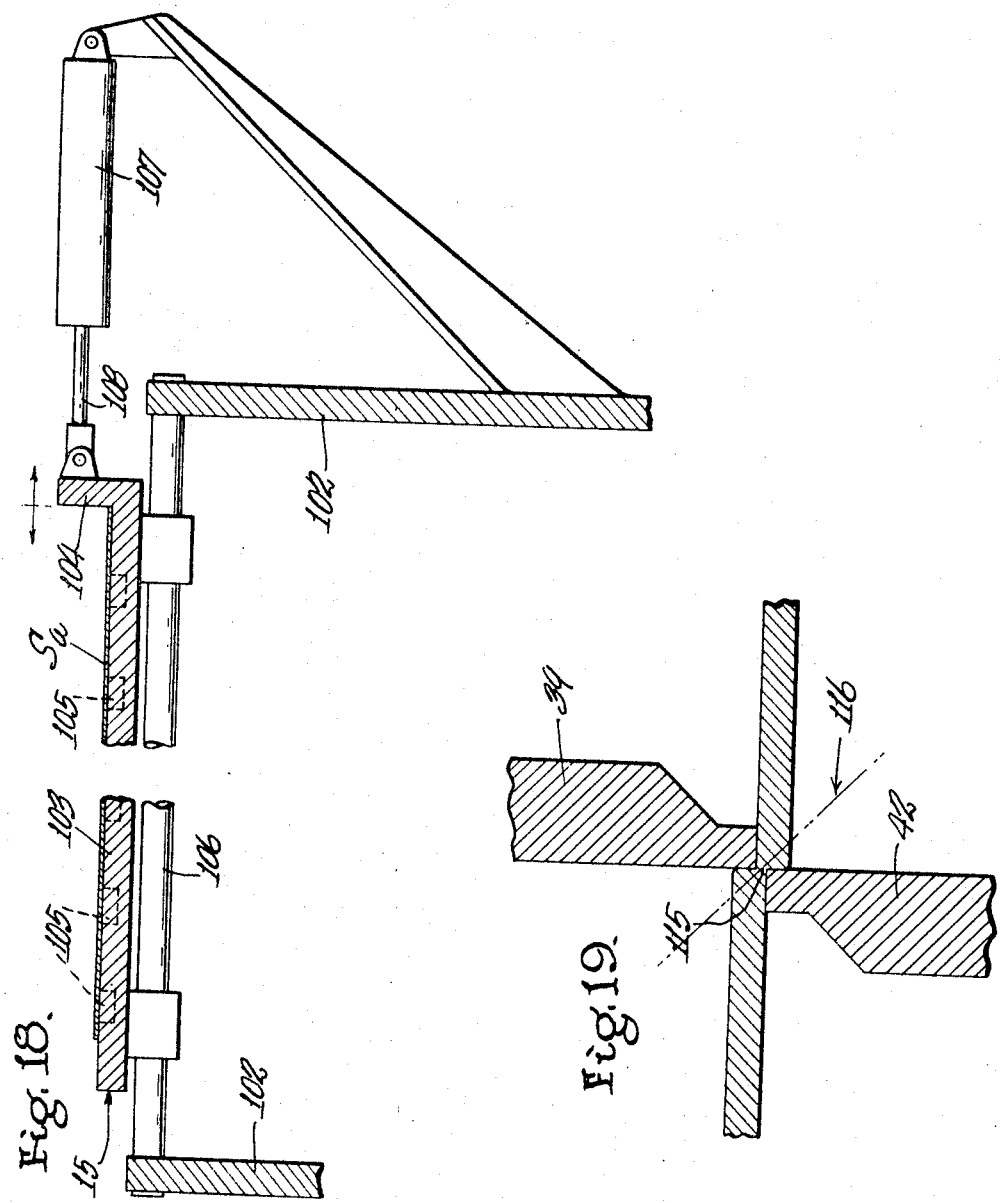

United States Patent Office 3,446,933
Patented May 27, 1969

3,446,933
APPARATUS FOR WELDING STRIP MATERIAL
Irving R. Taylor and Arthur L. Williams, Warren, Ohio, assignors, by mesne assignments, to Wean Industries, Inc., Warren, Ohio, a corporation of Ohio
Original application May 8, 1962, Ser. No. 193,156, now Patent No. 3,256,419, dated June 14, 1966. Divided and this application Jan. 19, 1966, Ser. No. 534,560
Int. Cl. B23k *11/06*
U.S. Cl. 219—82         13 Claims

ABSTRACT OF THE DISCLOSURE

Method and apparatus for resistance seam welding of overlapped strip ends which have been severed, clamped and aligned for the passage of roller electrodes thereover. Means are provided for sensing misalignment with means responsive to the sensing means to correctly align the strip ends. Strip marking means are also provided for identification purposes.

---

Figure 5:
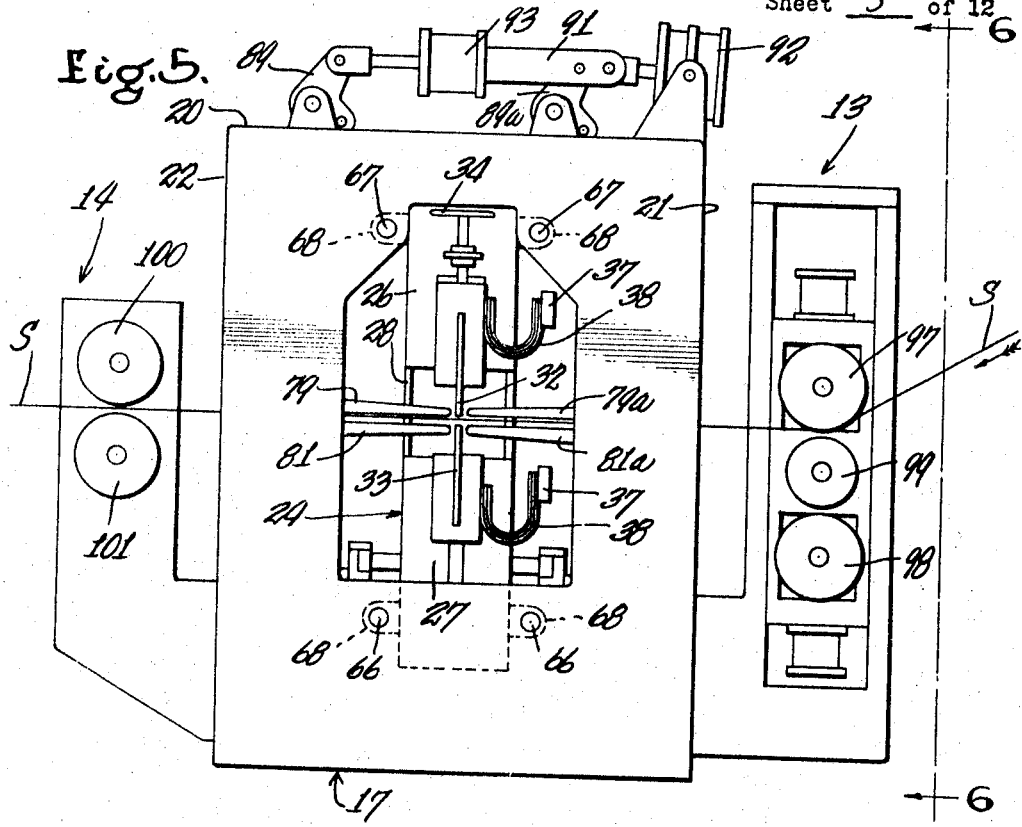

The present invention relates to the joining of sections of strip material in end-to-end relation to form a continuous strip length and the principal object of the invention is to provide new and improved methods and apparatus of such character. This application is a division of Patent No. 3,256,419, issued June 14, 1966.

Many strip processing lines require the incoming strip to be a continuous, unbroken length. This is necessitated because of the difficulty and time involved in threading the strip through the line. Moreover, in certain types of lines, the desired processing can only take place when the strip is running therethrough at a predetermined speed. Accordingly, the leading strip end which must be slowly threaded through the line at less than normal line speed cannot be properly processed. For the above reasons, threading of strip through the processing line is avoided wherever possible.

Unfortunately, strip cannot be procured in indefinite lengths but is only available in coils whose size is limited by manufacturing, handling and shipping considerations. It is therefore common practice to feed a coil of material into a processing line and, before it is entirely consumed, to secure the leading end of another coil of material to the trailing end of the first-named material coil. In this manner, a continuous strip of material is, in effect, fed to the processing line.

Because the leading and trailing strip ends must be secured together in as short a time as possible, welding is frequently employed for such purpose. Welding such ends together has the additional advantage of providing the high-strength juncture necessary where the strip is subjected to heavy tension.

Unfortunately, it is difficult to obtain consistently good welds between the leading and trailing strip ends unless such ends are overlapped a considerable amount. This, however, causes the thickness of the strip to be substantially doubled at the joint and, in many processing lines, this is highly undesirable. Attempts have been made to seam-weld the leading and trailing strip ends together with a very slight amount of overlap; however, prior art apparatus and methods were frequently too slow in operation, were unreliable and/or could not produce consistently satisfactory results.

The hereinafter to be disclosed method and apparatus consistently produces superior welds between leading and trailing strip ends by a narrow-overlap, seam-welding process which forms a joint which is little, if any, thicker than a single strip thickness and at the speeds required by modern, high-speed processing lines. Other advantages will readily become apparent from a study of the following description and the annexed drawings.

Figure 20:
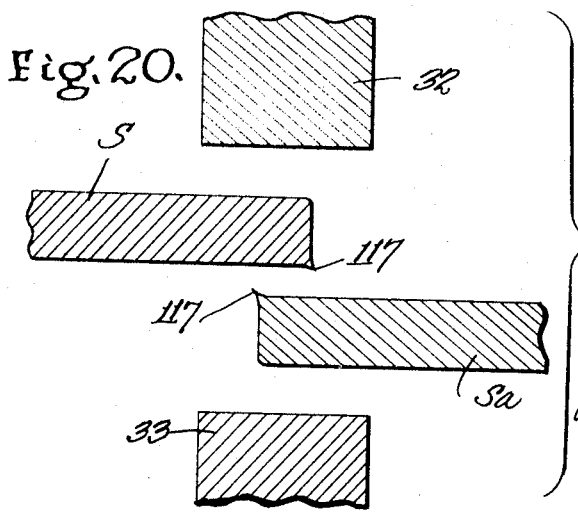

In the drawings accompanying this specification and forming a part of this application, there is shown, for purpose of illustration, an embodiment which the invention may assume, and in these drawings:

FIGURE 1 is a generally diagrammatic, side elevational view of the entry portion of a strip processing line with which the present invention is associated, FIGURE 2 is a top plan view of the structure seen in FIGURE 1, FIGURES 3 and 4 are views similar to FIGURE 1 but illustrating the position of parts at different operational stages, FIGURE 5 is an enlarged, front elevational view of a strip joining device which embodies the present invention, FIGURE 6 is a side elevational view generally corresponding to the line 6—6 of FIGURE 5 but with parts on the near side removed to show the underlying structure, FIGURE 7 is a further enlarged sectional view generally corresponding to the line 7—7 of FIGURE 6, FIGURES 8 and 9 are fragmentary views similar to FIGURE 7, but showing certain parts at different operational stages, FIGURE 10 is a fragmentary sectional view generally corresponding to the line 10—10 of FIGURE 7, FIGURE 11 is a fragmentary sectional view generally corresponding to the line 11—11 of FIGURE 7 but with certain portions on the near side broken away to better illustrate the underlying structure, FIGURES 12 through 17 are enlarged fragmentary views at various operational stages, of certain parts seen in FIGURE 7, FIGURE 18 is an enlarged, fragmentary sectional view generally corresponding to the line 18—18 of FIGURE 1, FIGURE 19 is an enlarged, fragmentary sectional view taken transversely through the shear blades of the present invention during a stage of the shearing operation, and FIGURE 20 is a further enlarged fragmentary view of the strip ends and the welding electrodes in transverse section in the relative positions they assume during the welding operation but showing them in separated relation for clarity.

With reference to FIGURES 1 and 2, there is illustrated strip joining apparatus 10 at the entry end of a strip processing line 11. Pay-off reels 12 and 12a of any conventional design rotatably support coiled strip material S, Sa respectively, which are adapted to be fed to the strip processing line 11 through the strip joining apparatus 10. As will hereinafter appear, a set of entry pinch rolls 13, a set of exit pinch rolls 14 and entry tables 15 and 15a are associated with the device 10.

Before proceeding with a detailed description of the joining device 10 and its associated parts, it may be helpful to briefly describe the operation. Still referring to FIGURE 1, it will be noted that strip S passes from the pay-off reel 12, over an idler roller 16, and under the uppermost roll of the entry roll set 13, through the joining device 10 along a predetermined pass line, between the exit roll set 14 and to the processing line 11. Payoff reel 12a, having previously been loaded with a coil of strip Sa, merely stands by with the leading end of the strip Sa resting upon the entry table 15 and projecting between the lowermost and center roll of the roll set 13.

Strip S will be fed longitudinally from right to left from the reel 12 into the processing line 11 until the coil 8 of material S on this reel is consumed. At such time, longitudinal movement of the strip S will be stopped, it will be gripped and transversely severed by the joining device 10, the leading end of strip Sa will be fed into the joining device where it will be transversely severed, the trailing end of strip S and the leading end of strip Sa will then be welded together, to form a continuous strip, and strip Sa then fed longitudinally from the pay-off reel 12a to the processing line until the coil of material Sa is consumed. While the strip Sa is being fed to the processing line, a new coil of material S will be loaded on the reel 12 for joinder to the trailing end of strip Sa when the latter is consumed. Thus, coiled strip will be fed alternately from the reels 12, 12a, the trailing end of one coil being welded to the leading end of the other to form an uninterrupted length of strip. The more specific manner and the structure for carrying out the foregoing operations will next be disclosed.

Turning now to FIGURE 6, joining device 10 comprises an elongated base 17 which extends transversely of the path of strip travel and is vertically enlarged at one end adjacent the path of strip travel to provide a box-like structure having a front wall 18, a rear wall 19, a top wall 20, and side walls 21, 22 (see also FIGURES 5 and 7) at its strip entry and exit sides respectively. For reasons which will later become apparent, the front, rear and side walls have enlarged openings to which reference will later be made.

As best seen in FIGURE 7, base 17 is generally trough-like in transverse section and has ways 23 for supporting a carriage 24 for movement in a direction edgewise of the strip. As herein illustrated, carriage 24 is provided with rollers 25 which ride along the base ways 23 to guide carriage movement.

Carriage 24, see FIGURE 6, is bifurcated to provide an upper arm 26 spaced above the path of strip travel and a lower arm 27 spaced below the path of strip travel. The carriage is thus of C shape with its open end adjacent the front wall 18 of the base and its closed end adjacent the rear wall 19 of the base in the carriage position shown in full lines. From the foregoing, it will be evident that carriage 24 provides an open throat 28 through which the strip S travels to the processing line. Means are provided for shifting carriage 24 from its full-line position to its phantom-line position and in the present embodiment, an externally threaded shaft 29 is rotatably carried by the base and is engaged with an internally threaded bracket 30 carried by the carriage. When shaft 29 is rotated in one direction, as by a motor unit 31, carriage 24 will be shifted along the base ways 23 to the right. Conversely, upon shaft rotation in the opposite direction, the carriage will be shifted to the left.

Welding means are carried by the free ends of carriage arms 26, 27 and in the present embodiment, an upper weld wheel 32 is rotatably carried by the upper carriage arm 26 while a lower weld wheel 33 is in opposed relation with wheel 32 and is rotatably carried by the lower carriage arm 27. Upper weld wheel 32 is normally held against vertical movement; however, its vertical position may be adjusted by means of a hand wheel mechanism 34 to compensate for varying weld wheel diameter caused by wheel wear. On the other hand, lower weld wheel 33 is vertically moved, by means of a fluid cylinder 35, toward wheel 32 to grip the strip therebetween. It will be understood that when lower weld wheel 33 is elevated by cylinder 35 and the carriage is shifted to the right, the weld wheels will traverse the strip from edge-to-edge thereof. Such action will later be more fully disclosed during the latter to appear in the description of the welding operation.

Still referring to FIGURE 6, a welding transformer 36 of any suitable design is carried by the rear, or right-hand end of carriage 24 and has bus bars 37 (see FIGURE 5) extending toward the free ends of the carriage arms 26, 27 for carrying welding current to the weld wheels. Each bus bar may be flexibly connected to a respective weld wheel supporting structure by means of the usual laminated lead 38.

As previously mentioned, the present joining means is adapted to transversely sever the leading and trailing strip ends before welding them together; accordingly, shear means are provided for this purpose. As will later appear, such shear means comprises a moveable shear blade cooperable with a fixed shear blade to sever strip disposed therebetween. Since only one of the shear blades is moveable, considerable mechanism with attendant weight, costs and space is saved.

Turning now to FIGURES 7 and 11, it is an important feature of the present invention that the shear means is disposed within the throat 28 of the carriage 24 to provide an extremely compact assembly. Such shear means comprises an upper shear blade 39 which extends transversely of the strip and is somewhat longer than the strip width. This blade is secured in any suitable manner to an upper shear support 40 which is in turn removably secured to the underside of carriage arm 26 by means of toe clamps 41. A lower shear blade 42 is secured to a lower shear blade support 43 which is fastened to a vertically shiftable platen 44 by means of suitable capscrews. In the position of parts shown, upper shear blade 39 is spaced above the normal path of strip travel while lower shear blade 43 is normally spaced below the strip travel path. It will be understood that when platen 44 is elevated by means later to be described, the lower shear blade will cooperate with the upper shear blade (see also FIGURE 19) to transversely shear strip disposed between the blades.

Since setting up a pair of shear blades for proper shearing action is a critical, time-consuming operation, it is preferable that this be done at leisure in the machine shop, for example, where facilities are available, rather than setting up the blades in situ in the joining apparatus. When this can be done, considerable down time of the joining apparatus can be avoided.

In order to permit the shear blades to be set up outside of the joining apparatus and as seen in FIGURE 11, upper shear blade support 40 has a depending guide pin 45 anchored therein to the rear of the path of strip travel which is slidably received in a guide bushing 46 carried by the lower shear blade support 43. Similarly, and to the front of the path of strip travel, a guide pin 47 depends from the upper shear blade support 40 and is slidably received in a guide bushing 48 carried by the lower shear blade support 43. The arrangement is such that the guide pins guide movement of the lower shear blade 42 toward and away from the upper shear blade 39 during vertical movement of the platen 44.

While guide pin 45 is anchored in the upper blade support 40, guide pin 47 is slidable in a bushing 49 carried by such support. Guide pin 47 is removably secured in end-to-end relation to a plunger 50 by means of a bolt 51 and this plunger is pivotally connected to a lever 52 which is pivoted within the upper carriage arm 26 at 53. For a purpose to appear, a fluid cylinder 54 is pivotally connected to the lever 52 for elevating the pin 47 from its full-line position shown to its phantom-like position where in its lower end is spaced above the plane of strip travel.

When the shear means is to be removed from the carriage throat for replacement or for maintenance purposes, the capescrews holding the lower shear support to the platen 44 will be removed and the screw 51 connecting the guide pin 47 to the plunger 50 loosened sufficiently to disengage this pin from the plunger. Toe clamps 41 may next be removed to detach the upper shear support from the upper carriage arm. The entire shear assembly, including the two shear blades, their respective shear supports and the guide-pins may now be removed as a unit from the carriage. Unitary replacement of the shear means may quickly be effected in but a few moments by reversing the above steps, it being understood that the shear blades in the replacement unit were previously set up for proper shearing action since the guide pins 45, 47 maintain the shear supports and thus the shear blades in the same alignment away from the joining apparatus that they assume when mounted in the carriage throat thereof.

Turning now to the means for effecting elevation of platen 44 to effect the shearing operation previously described, and as best seen in FIGURES 7 and 11, platen 44 has a depending web 55 straddled by pairs of links 56 which have one end pivoted thereto at 57. The opposite ends of such link pairs are pivoted to a bar 58 at 59. Also pivoted to the bar 58 at 59 are the upper ends of respective links 60 whose lower ends are respectively pivoted to the lower carriage arm 27 at 61. From the foregoing, it will be clear that the links 56, 60 form a toggle mechanism for multiplying the force exerted by a fluid cylinder 62 pivoted to the bar 58 at 63 and pivotally anchored to the lower carriage arm at 64. For preventing horizontal movement of the platen 44, its web 55 may be confined between and slidable on members 65 which form a part of the carriage lower arm 27. Although not shown, any suitable means may be employed to prevent horizontal platen movement in a plane transverse to that in which the members 65 function.

Normally, when a shear mechanism is mounted between cantilever supported arms, the latter and the structure which ties them together at their supported ends must be made quite large and heavy to provide sufficient rigidity to obviate excessive arm deflection as a result of the arm separating forces developed by the shearing operation. In the present structure, however, a novel and very effective arrangement is employed to prevent deflection of the cantilever supported carriage arms 26, 27 without using a very massive, costly structure.

As best seen in FIGURES 5 and 6, a pair of pins 66 are anchored to the front wall structure 18 of the base 17 at the level of the lower carriage arm 27 and a similar pair of pins 67 are anchored to such wall structure at the level of the upper carriage arm 26. These pins project rearwardly toward the base wall 19 and are respectively closely but slidably received within lugs 68 carried by the free ends of respective carriage arms.

With the carriage disposed in its shearing position seen in FIGURE 6, the pins 66, 67 are seated in the arm lugs 68 and effectively tie the free ends of the carriage arms 26, 27 together, through the front wall structure 18 of the base 17, against the heavy separating forces developed when strip is sheared. However, upon rearward carriage movement, the arm lugs pull away from the pins and thus the left (or front) ends of the carriage arms are free to clear the strip disposed therebetween.

It is an important feature of the present invention that each strip end is tightly clamped before it is sheared, that it is sheared closely adjacent the place where it is clamped, and that each strip end remains clamped until the operation welding the strip ends together is completed. This is accomplished by strip clamping structure next to be described.

With reference to FIGURE 7, a pair of strip clamping structure are provided, an exit clamp assembly 69 to the left (in the position of parts viewed) of the line of shear and an entry clamp assembly 70 to the right of the line of shear. Since these assemblies are very similar, only the exit clamp assembly will be described in detail and corresponding entry clamp assembly parts will be identified with the same reference characters but with the suffix $a$ added. Where, however, the clamp assemblies differ in material respects, such differences will later be specifically pointed out.

Exit clamp assembly 69 comprises a generally rectangular frame 71 formed of side walls 72 at opposite sides of the path of strip travel (see also FIGURE 10), joined by an integral, vertically extending wall 73. As herein shown, frame 71 is spaced some distance longitudinally of the strip from the line of sheer. Wall 73 has a horizontally elongated opening 74 at the strip pass line through which the strip extends and pivotally attached at one end to each frame side wall 72 by pivot pins 75 are a pair of parallel, vertically spaced links 76 whose opposite ends are pivoted at 77 to ribs 78 (FIGURE 10) which are integral with the base 17.

Extending transversely of the path of strip travel is an upper clamp arm 79 herein shown formed integrally with the frame 71. As illustrated, arm 79 projects from the frame toward the line of shear and terminates closely thereadjacent in a replaceable wear strip 80. Underlying the upper clamp arm is a lower clamp arm 81 which is pivoted between the frame side walls 72 at 82 and terminates closely adjacent the line of shear in a replaceable wear strip 83. Lower clamp arm 81 has an upwardly angled portion 84 on each side of the path of strip travel and each terminates in a pivot 85 to which is attached the piston rod of respective fluid cylinders 86 (hereinafter to be referred to as clamp cylinders) whose opposite ends are pivotally connected to an upwardly projecting portion 87 of respective frame side walls 72.

From the foregoing, it will be understood that when the clamp cylinders 86 are simultaneously actuated to extend their piston rods, lower clamp arm 81 will be shifted about its pivot 82 to grip strip disposed between the jaws provided by respective wear strips 80, 83.

Means are provided for elevating the frame structure 71 (together with the attached lower clamp arm 81) and in the present embodiment, a link 88 is pivotally attached to each frame side wall portion 87 and projects upwardly through an aperature in the base top wall 20 for pivotal connection to one end of respective bell crank members 89. Members 89 may be secured to a pivotally supported shaft 90 which connects such members for unitary movement.

The means provided for elevating the entry clamp structure 70 is substantially a duplication of that employed with exit clamp structure 71; accordingly, such means are also identified with the same reference characters but with the suffix $a$ added.

Pivotally connecting the opposite ends of adjoining bell crank members 89, 89a are respective links 91 and to the right-hand end of each link 91, a pivotally mounted fluid cylinder 91 (each hereinafter to be referred to as clamp lift cylinder) is pivotally connected. For reasons to appear later, a link extension fluid cylinder 93 is interposed in each link 91 intermediate the bell-crank members 89, 89a for the purpose of increasing the length of respective links 91 at an appropriate stage of the operation.

It will now be evident that when the clamp lift cylinders 92 are actuated to extend their piston rods, links 91 will be moved to the left thus causing bell crank members 89, 89a to rotate about their respective shafts 90, 90a. This will exert an upward pull on the links 88, 88a thus simultaneously elevating the exit and entrance clamp assemblies. Upon actuation of the clamp lift cylinders to retract their piston rods, the clamp assemblies will again be lowered, respectively threaded stop members 94 functioning to adjustably limit downward clamp member movement. For reasons later to be discussed, the links 76, 76a of respective clamp assemblies constrain the latter to arcuate movement during elevation and lowering thereof.

One of the principal differences between the exit and entrance clamp assemblies is that while the former is pivoted directly to the base 17 by its link pairs 76, the latter is pivoted at 77a to repsective slides 95 by its link pairs 76a. Slides 95, only one of which can be seen in FIGURE 7, are vertically shiftable by means of a suitable screw-threaded mechanism 96, such shifting of the slides causing a change in the arcuate path of movement of the entry clamp structure 70 for a purpose to appear.

Returning once again to FIGURE 5, entry pinch rolls 13 comprise three vertically spaced rolls; and upper roll 97, a lower roll 98, and an upper intermediate roll 99. Means not shown, are provided for rotating the intermediate roll, the upper and lower rolls merely being idler rolls. Any suitable means, such as fluid cylinders, may be employed to shift the rolls 97 and 98 toward and away from roll 99 to respectively grip and release strip disposed therebetween. Furthermore, although not shown, means are also provided for bodily shifting all three of these rolls vertically to align either the pass between rolls 97, 99 or the pass between rolls 98, 99 with the strip pass line of the joining apparatus.

Exit pinch rolls 14 are quite simple, such rolls merely comprising an upper roll 100 and lower roll 101 between which the strip passes from the joining apparatus to the strip processing line. Means are provided for selectively moving the rolls 100, 101 toward each other to grip strip therebetween and at least one of such rolls may be driven.

With reference to FIGURE 1, an important feature of the present invention is the previously mentioned strip entry tables 15, 15a which are preferably identical except for their location. Table 15 is supported on a base 102 for underlying the strip Sa closely adacent the entry pinch rolls 13 while table 15a may be similarly supported for underlying the strip S.

Table 15, as seen in FIGURE 18, comprises a flat portion 103 margined at one edge of the strip by rectilinear flange portion 104. Table portion 103 and its co-extensive flange portion 104 extends some distance longitudinally of the strip for a purpose to appear. Embedded in the surface of table portion 103 are a plurality of electromagnets 105 which, when energized, hold the strip Sa tightly against the table.

Extending transversely of the strip and supported by the base 102 are a pair of parallel rods 106 along which the table 15 is slidable. A fluid cylinder 107 is supported by the base 102 and has its piston rod 108 connected to the table flange portion 104 for the purpose of reciprocating the table along the rods 106.

Table 15a is preferably identical to table 15 and may be supported on a base (not shown) similar to 102 or even on an extension of base 102. Table 15a, of course, is also mounted for reciprocation in a direction edgewise of the strip by means of a fluid cylinder identical to 107 hereinabove described.

As seen in FIGURE 2, a strip edge sensing device 109 of any suitable type is disposed at the exit side of the strip joining apparatus 10 and is operably connected to respective table shifting cylinders 107 where by the flange portion 104 of each of the tables is continuously maintained in predetermined relation with the edge of the strip exiting from the joining device. Normally, each flange portion 104 will be maintained in precise alignment with such strip edge for reasons to appear.

With the parts positioned as seen in FIGURES 1, 5, 6, 7 and 11, strip S will be fed from the coil on pay-off reel 12, over the roll 16 under the roll 97 of the entry punch rolls 13, through the joining device 10, the separated rolls of the exit pinch roll set 14 and to the processing line 11. As may be best seen in FIGURE 7, the strip freely travels between the open entry and exit clamp assemblies 70 and 69 respectively and between the separated shear blades 39, 42. Note that the entry table 15a is disposed beneath the path of strip travel so as not to interfere therewith.

A coil of strip Sa is shown mounted on the pay-off reel 12a with the leading strip end resting on the entry table 15 and projecting between the separated rolls 98, 99 of the entry pinch roll set 13. In placing the strip S on the entry table 15, the operator will push the against the table flange portion 104 and then energize the table electromagnets 105 to retain the strip tightly upon the table. With the edge of strip Sa against the table flange 104, such strip edge will be maintained in alignment with the traveling strip Sa as a result of the operation of sensing device 109 and the table shifting cylinder 107.

When substantially all of the strip S on pay-off reel 12 has been unwound, a small amount normally being retained thereon since it is usually undesirable to run it through the processing line, the travel of strip S will be terminated and the entry rolls 97, 98 and 99 moved together to grip respective strips S, Sa. Magnets 105 in entry table 15 may now be de-energized since the latter has served its functions of maintaining strip Sa aligned with the trailing end of strip S and the function of maintaining the strip Sa against undesirable displacement having now been taken over by the rolls 98, 99 of entry roll set 13.

Figure 12:
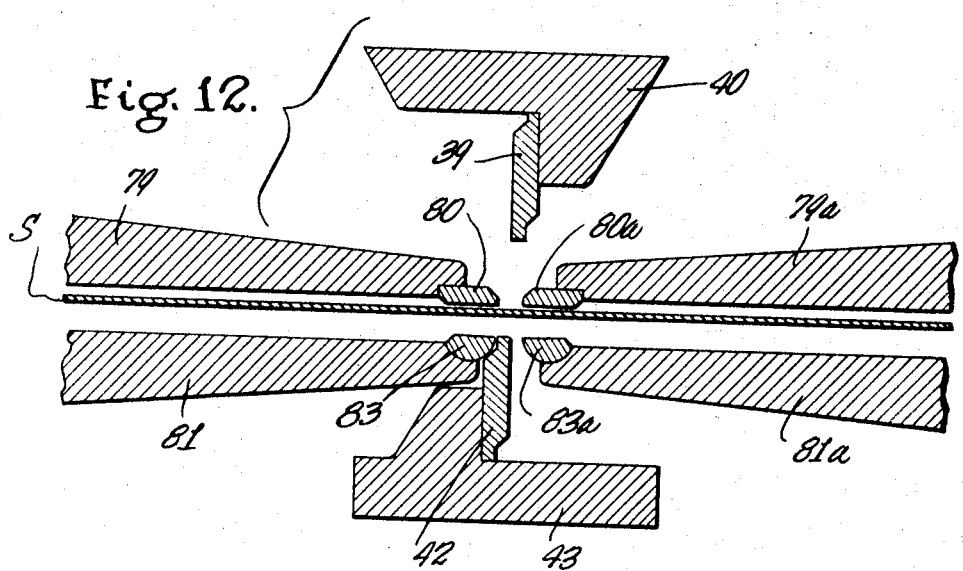

Clamp lift cylinders 92 may now have their piston rods extended to raise the entry and exit clamp assemblies 70, 69 from the positions shown in FIGURES 7 and 12 to the positions shown in FIGURES 8 and 13. Substantially at the same time, clamp cylinder 86 will be actuated to close the jaws of upper and lower clamp arms 79, 81 of the exit clamp assembly on the strip S as illustrated in FIGURES 8 and 13. Note that the strip S has been elevated by the exit clamp assembly to shearing position wherein it abuts the underside of the upper shear blade 39. Exit pinch rolls 100, 101 may, if desired, be closed on the strip S, it being understood that the entry clamp assembly remains open, as illustrated, at this time.

Shearing of the strip S transversely will next take place by elevating the lower shear blade 42 to cooperating relation with the upper shear blade 39 by means of the fluid cylinder 62. Following shearing of the strip S, blade 42 will be lowered to the position illustrated and the exit clamp assembly will be further elevated from the position seen in FIGURES 8 and 13 to the position seen in FIGURES 9 and 14 by extending the piston rods of link extension cylinders 93. This raises the trailing end of strip S for a purpose next to appear.

The entry pinch rolls of the roll set 13 will now be raised from the position seen in FIGURE 1 to the position seen in FIGURE 3. This substantially aligns the pass between rolls 98, 99 with the pass line of the strip through the joining apparatus. Intermediate roll 99 of the entry roll set 13 will now be rotated in the direction of the arrow to withdraw the scrap end of strip S from between the entry clamp arms 79a, 81a and to feed the leading end of strip Sa therebetween and beyond the shear blades 39, 42 as seen in FIGURES 9 and 15. Note that the exit clamp arms are at this time raised out of the path of the entering, leading strip end Sa. Although not shown, suitable guides will be provided to insure entry of the leading end of strip Sa between the entry clamp arms. Pay-off reel 12 may now be rotated in a direction to wind thereon the scrap end of strip S remaining attached thereto.

Figure 16:
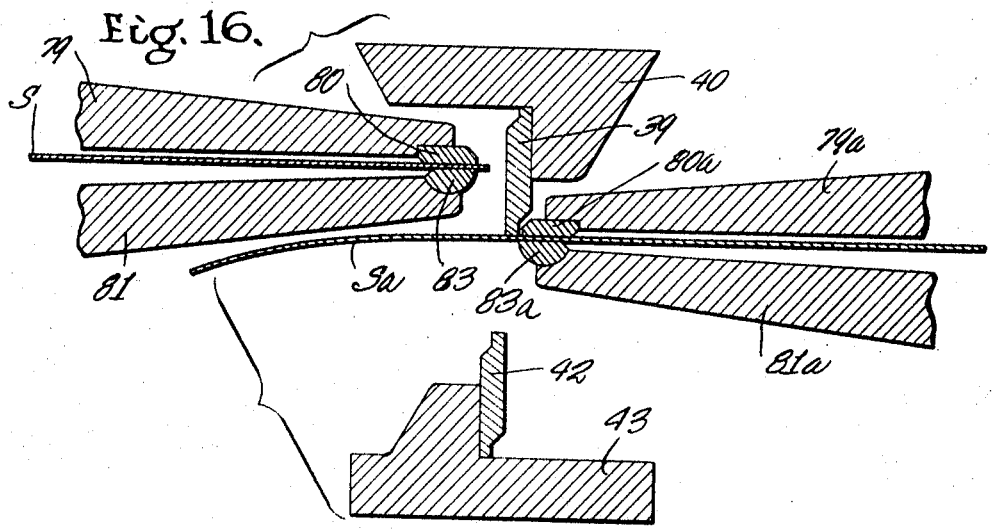

With the leading end of strip Sa positioned as seen in FIGURES 9 and 15, entry clamp cylinder will now be actuated to close the jaws of upper and lower clamp arms 79a, 81a on the strip Sa as illustrated in FIGURE 16. Note that the strip Sa is thus held in shearing position wherein it abuts the underside of the upper shear blade 39. Shearing of the strip Sa transversely will next occur by momentarily elevating the lower shear blade 42 to cooperating relation with the upper shear blade 39 and then once again lowering the lower shear blade. The sheared off portion of strip Sa will gravitate down a discharge chute (not shown) and may later be removed by the operator.

Figure 17:
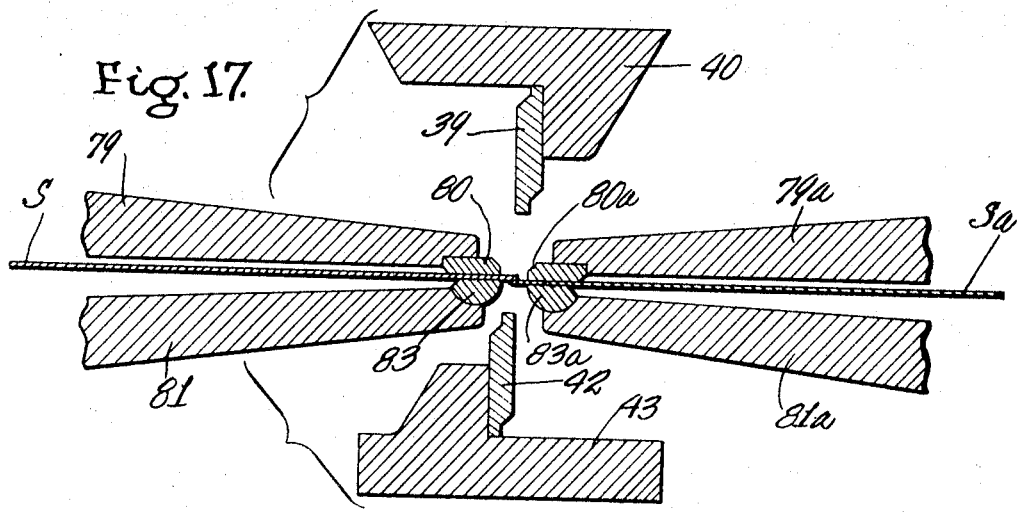

Upon the return of the lower shear blade 42 to its lowermost position illustrated, the clamp lift cylinders 92 and the link extension cylinders 93 will be actuated to retract their piston rods to thus permit the clamp assemblies to fall to their lowermost positions seen in FIGURE 17. Since the exit clamp assembly was previously raised higher than the entry clamp assembly, the latter will reach its lowermost position first and since the clamp assemblies move in an arcuate path about their supporting links 76, 76a, the severed strip ends will be slightly overlapped with the trailing strip end S on top of the leading strip end Sa.

As herein shown, the strip ends have been overlapped their minimum amount which, in the present embodiment, is approximately forty thousandths of an inch. However, in the event a greater amount of overlap is desired, it is only necessary to lower the slides 95 (FIGURE 7) by means of the screw-threaded mechanism 96.

With the strip ends overlapped as seen in FIGURE 17, the lower weld wheel 33 will be raised by its cylinder 35 and the front shear pin 47 (see FIGURE 11) raised from its full-line position across the plane of the strip to its phantom-line position spaced above such plane by means of the pin lift cylinder 54. The carriage 24 will now be shifted by its motor unit 31 to the right as seen in FIGURE 6. As the juxtaposed weld wheels pass over the overlapped strip ends, a suitable mechanism will turn on the welding current which will pass from one wheel to the other through the overlapped strip ends and the latter will be fused together as a result of the heat of fusion caused their resistance to current passage and by the pressure exerted by the weld wheels.

Still referring to FIGURE 6, the weld progresses from left to right and when the weld wheels reach the right edge of the overlapped strip ends, the weld current will be turned off, the exit and entry clamp arms 79, 81 and 79a, 81a respectively will be opened once again to positions seen in FIGURES 7 and 12, the rolls of entry and exit pinch roll sets 13, 14 will be separated, the lower weld wheel 33 will be lowered, and the strip once again permitted to travel unimpeded through the joining apparatus to the processing line. At this time, however, strip Sa will be fed to the processing line from the reel 12a.

The carriage may now be returned to the full-line position seen in FIGURE 6 and the pin 47 once again lowered to the full-line position shown in FIGURE 11. The operator may now remove the previously mentioned piece sheared from the leading end of strip Sa and also remove the scrap end of strip S remaining on pay-off reel 12. A new coil of strip S may now be loaded on the reel 12 and its leading end passed over the roll 16, over the entry table 15a and between the now open rolls 97, 99 of the entry roll set 13 (see FIGURE 4). The strip S will be pushed against the upstanding flanges of the entry table 15a and the table magnets energized to maintain the strip firmly on the table. Strip S will now be maintained in alignment with the strip Sa through operation of the strip sensing device 109 and the entry table shifting cylinder.

Nothing further need be done until such time as the coil of strip Sa is depleted; however, the operator may, if desired, readily inspect the weld wheels 32, 33 through the opening in front wall 18 and may dress the periphery of such wheels, if necessary.

When all or substantially all of the strip Sa has been unwound from the coil on reel 12a and fed to the processing line, longitudinal feeding of the strip Sa will be stopped, it will be clamped and sheared by the joining device, the scrap end of a strip Sa will be withdrawn from the joining devices and the leading end of strip S will be fed into the joining device and clamped, sheared and welded to the trailing end of strip Sa, all in the manner similar to that previously described; this time, of course, Sa being the trailing strip and S being the leading strip.

In some operations, the welded seam which joins respective strip ends must be removed at the exit end of the processing line. Accordingly, means are provided for marking the strip ahead of the seam for positive identification thereof by, for example, an electric eye device (not shown). As herein disclosed and with reference to FIGURE 7, exit clamp frame 71 supports a punch structure 110 which comprises a slide 111 which carries a pair of punches 112 which closely fit within apertures in the upper clamp arm 79. Carried by the lower clamp arm 81 are pair of hardened sleeves 113 in alignment with respective punches 112 and of a size to closely receive them. Finally, a fluid cylinder 114 is carried by the frame 71 for reciprocating the slide 111. In the interest of simplicity such structure 110 has been omitted from FIGURES 8 and 9.

Punch structure 110 will be actuated during the time interval that the exit clamp arms 79, 81 are closed on the strip and at such time, cylinder 114 will momentarily push the punches 112 down through the strip and into the sleeves to thus pierce two holes in the strip.

When strip is sheared, as shown in exaggerated relation in FIGURE 19, the adjoining knife edges are moved toward each other to progressively cut into respective sides of the strip until the latter is nearly cut through as illustrated. During the final stages of blade movement, however, the remaining neck of material 115 connecting the strip portions on opposite sides of the blades tends to be squeezed off, along the plane 116, to thus leave a ragged projecting edge 117 (FIGURE 20). Since such edge is very sharp and is, moreover, work-hardened, it will cause rapid weld wheel wear if the wheel bears against it during the welding operation.

With reference once again to FIGURE 19, it will be noted that the strip piece to the left of the line of shear will have its burred edge facing downwardly while the strip piece to the right of the line of sheer will have its burred edge facing upwardly. Accordingly, since the sheared trailing strip end is at the left of the line of shear and the sheared leading strip end is at the right thereof, and since the trailing strip end is disposed above the leading strip end during welding as illustrated in FIGURE 20, the burred edges are turned inwardly where they cannot cause rapid weld wheel wear as the wheels are drawn along the overlapped strip ends during the welding operation.

While the function of exit pinch rolls 14 has not heretofore been pointed out, it is to be understood that in the present embodiment they will only be used to shift the strip if, after a weld is made, it should be desirable to shear the welded juncture of the two strips out in the event the weld is defective or to permit close inspection of the weld. They may also be used to shift the strip when, after the trailing end is once sheared, it should be necessary to shear such end a second time if, for example, the first shearing operation was not satisfactory.

In view of the foregoing, it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim

1. Apparatus for joining strip sections in end-to-end relation comprising clamp means for holding leading and trailing strip ends in adjoining relation, joining means for securing said strip ends together along a transverse line of juncture to form a continuous strip, and strip marking means for removing a portion from a strip section at a place spaced a predetermined distance longitudinally of said line of juncture of the strip ends.

2. The construction of claim 1 wherein said strip marking means comprises a punch which forms an aperture in the strip section.

3. The construction of claim 1 wherein said strip marking means comprises a punch mechanism which forms a pair of adjoining apertures in the strip section.

4. Apparatus for joining longitudinally movable strip sections in end-to-end relation comprising joining means for securing a trailing strip end to a leading strip end along a line of juncture extending transversely of the strip ends, clamp means for holding the leading and trailing strip ends in adjoining relation during juncture thereof, one of said clamp means being supported at a place spaced longitudinally of the strip from said line of juncture and having portions projecting toward said line of juncture and terminating in strip gripping surfaces thereadjacent, and strip marking means intermediate said clamp means place of support and said line of strip juncture for removing a portion from a strip section.

5. The construction of claim 4 wherein said strip marking means comprises a punch which forms an aperture in the strip section.

6. The construction of claim 4 wherein said strip marking means is carried by said one clamp means.

7. The construction of claim 6 wherein said strip marking means comprises a punch mechanism which forms a pair of adjoining apertures in the strip section.

8. In apparatus through which strip material normally travels longitudinally in a predetermined direction and having means for joining the trailing end of a first strip to the leading end of a second strip to form a continuous strip length, the improvement comprising:

first clamp means spaced from said joining means longitudinally of and opposite the normal direction of strip travel and clamping the leading end of the second strip against longitudinal movement and retaining such end in a position spaced flatwise of the path of travel of said first strip while the latter is traveling through said apparatus, second clamp means closely adjacent said joining means and having first and second portions disposed on opposite sides thereof relative to the normal direction of strip travel for respectively clamping said first and second strips prior to operation of said joining means, and shifting means for effecting movement of said first clamping means and the leading end of said second strip clamped thereby in a direction from side edge to side edge of such second strip end, said shifting means being responsive to the position of a side edge of the trailing end of said first strip to dispose the leading end of said second strip in predetermined relation with the edge aforesaid of the trailing end of said first strip.

9. The construction of claim 8 wherein said shifting means is responsive to the position of a side edge portion of the trailing end of said first strip which is spaced longitudinally of said joining means in the normal direction of strip travel.

10. The construction of claim 8 wherein said shifting means comprises sensing means spaced longitudinally of said joining means in the normal direction of strip travel for sensing the position of the side edge of the trailing end of said first strip.

11. The construction of claim 8 wherein said second clamping means is engageable with a side edge of the leading end of said second strip.

12. The construction of claim 8 wherein said second clamping means has a table-like portion for underlying and supporting the leading end of said second strip, and wherein said table-like portion has shoulder means engageable with longitudinally spaced portions of a side edge of the leading end of said second strip.

13. The construction of claim 12 wherein said strip is magnetic, and wherein said table-like portion has a magnet for attaching a flat side of the leading end of said second strip thereto.

References Cited
UNITED STATES PATENTS

| | | | |
|---|---|---|---|
| 2,800,567 | 7/1957 | Cooper | 219—82 |
| 2,827,809 | 3/1958 | Beam | 226—194 |
| 3,017,495 | 1/1962 | Woodwaid | 219—82 |
| 3,021,416 | 2/1962 | Mallett et al. | 219—82 |
| 3,102,189 | 8/1963 | Jones et al. | 219—82 |
| 3,198,413 | 8/1965 | Cooper | 219—82 X |

RICHARD M. WOOD, Primary Examiner.

B. A. STEIN, Assistant Examiner.

U.S. Cl. X.R.

226—19